United States Patent Office 3,460,271
Patented Aug. 12, 1969

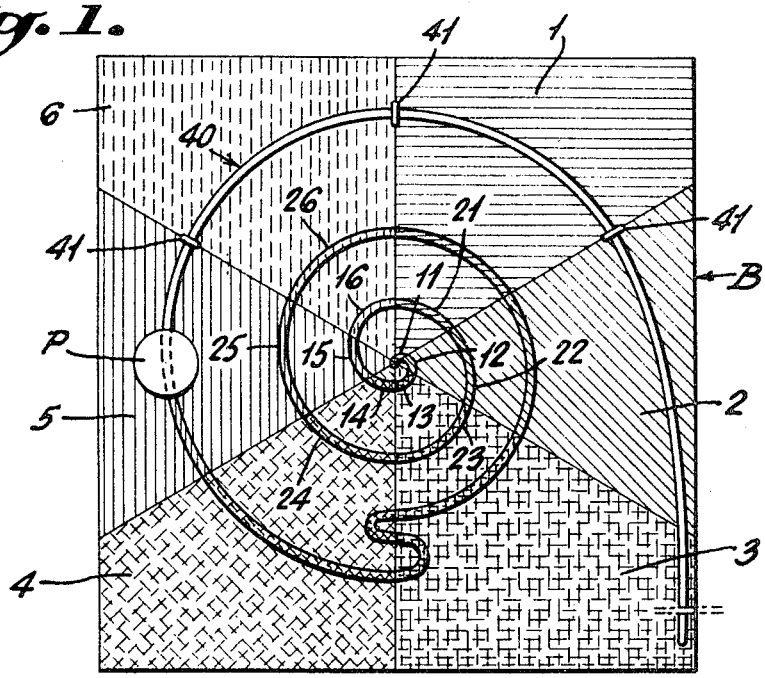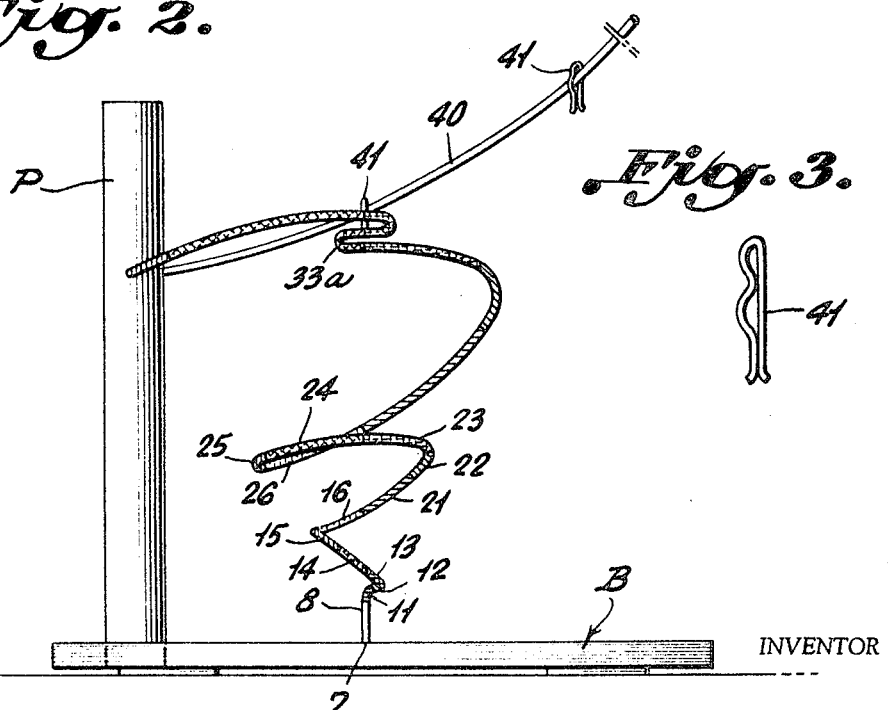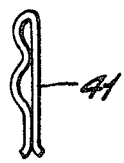

3,460,271
TEACHING AID DEVICE
Earl C. Saxon, Pikesville, Md.
(2504 Rellim Road, Baltimore, Md. 21209)
Filed Nov. 6, 1967, Ser. No. 680,888
Int. Cl. G09b *19/00*
U.S. Cl. 35—21                                6 Claims

ABSTRACT OF THE DISCLOSURE

The device comprises a model having a base subdivided into distinctively colored sectors indicating stages of development, and a conical helix of wire or other flexible material which rises or falls with ever widening spirals from the center of the base to indicate growth or decline. The portions of the spirals are colored to coincide with the color of the sector below it. An extension of the helix and movable markers may be provided for prognostication and discussion purposes.

Background of the invention

The invention seeks to provide a visual aid in the teaching of history and other social sciences. The teacher or lecturer is able to put his subject "across" with greater effectiveness by means of this aid which supplements the oral presentation.

Summary of the invention

The invention consists in a model formed of wire or other flexible material shaped in the form of a conical helix rising in ever widening spirals from the center of a base which is subdivided in a plurality of radial sectors. The spirals are similarly subdivided in similar sectors to indicate the stages of development and axial advance or regression of the spiral relative to the base is a measure of growth of a factor in either a forward or reverse direction. The radial spacing between successive spirals may also serve as a measure of time or time lapse.

Objects and description of the invention

It is the object of the invention to provide an interesting teaching aid which is capable of demonstrating visually repetitive phenomena which occur cyclically in different social sciences, such as history, anthropology, religion, etc. The inventive visual aid illustrates in a particularly graphical manner the repetitive pattern found in history in the rise and fall of civilizations—their birth, growth, decay and even occasional relapses.

It is a further object of the invention to provide a teaching aid of simple construction and low cost which may be used to illustrate graphically the rise and fall of successive civilizations and the portrayal of the possibility of events to come with the passage of time.

Other objects and purposes will appear from the detailed description of the invention following hereinafter, taken in conjunction with the accompanying drawing wherein, FIG. 1 is a plan view of a preferred embodiment of the device in accordance with the invention;

FIG. 2 is a front elevation thereof; and

FIG. 3 is a front elevation of a detachable clip, several of which may be used with the device.

As shown in the drawings, the teaching aid is constituted by a base B which may be formed of any desired material such as wood, plastic, ceramic and the like, and which is sub-divided into a plurality of angular sectors to signify stages of development. These sectors are distinguishable from each other, and, as shown in FIG. 1, the area of the base is divided into six equal sections 1, 2, 3, 4, 5 and 6, of 60° each, which are colored differently and which in the illustrated embodiment are colored blue, green, yellow, orange, red and purple, respectively. From the center of the base 7 protrudes a conical helix which may be formed of wire or any other flexible material.

The downwardly extending stem 8 of the conical or conoidal helix may be fixed or detachably mounted within the base at its center 7. Diverging therefrom are a plurality of ever-widening spirals in which the portions thereof are colored correspondingly to the colors of the sectors of the base which underlie it. Thus, as shown in FIG. 2, the initial portion 11 of the smallest spiral extending from the top of the stem 8 is colored blue, the next portion 12 is colored green, followed by lengths 13, 14, 15 and 16 which are colored yellow, orange, red and purple, respectively. The spiral continues upwardly and outwardly into another series of lengths 21, 22, 23, 24, 25 and 26 which in turn are colored blue, green, yellow, orange, red and purple, respectively.

The device is especially useful in the study of history and the portrayal of the development of successive civilizations. Because of the flexibility of the conoidal helix, the course thereof may be bent so that it does not experience a continuous upward direction and at times may be bent in a downward direction as shown at point 25 to indicate a decline in a civilization, rather than an advance or growth therein, as each civilization is portrayed in its stages of development on the preceding ones. The degree of the advance or decline may also serve to illustrate the extent of transition between successive civilizations.

The device may also be used to illustrate relapses in a continual advance pattern by means of reversely bent or re-entrant portions as shown at 33a in the third spiral of the device.

The device is useful to illustrate the cyclical development of phenomenon, with the passage of time, through stages of development as represented by the differently colored sectors of the base. The scope of the variations between successive civilizations may be illustrated by the lateral spacing between the successive spirals in a horizontal plane and the spirals may be contracted or extended in this plane to portray this variable.

In addition to the conoidal helix which may be mounted on the base, the device makes possible a protraction of the pattern by the provision of a post P which may be fixedly or detachably mounted on the base and which serves as an anchor for a continuation 40 of the conoidal spiral, the terminal end of which is also fixed in the post at an upper level thereof.

The continuation 40 permits an adjustable movement thereof for the purpose of analysis or prognostication of events and in order to define the variable parts thereof which overlie the base. Clips 41 of the type shown in FIG. 3, or any analogous detachable markers, may be provided, which may be adjustably mounted along the length to coincide with lines of divisions of the sectors into which the base is divided.

Any other marking devices besides detachable clips may be used for this purpose to mark the points of incidence on the section 40 with the vertical projections of the division lines on the base.

While I have described my invention as embodied in a specific form and as operating in a specific manner for purposes of illustration, it should be understood that I do not limit my invention thereto, since various modifications will suggest themselves to those skilled in the art, without departing from the spirit of my invention, the scope of which is set forth in the annexed claims.

I claim:

1. An educational device comprising a base having a plurality of differently colored sectors diverging from a common center, a generally conical helix extending upwardly from said base with its apex at said common center and the turns of said helix extending in ever widening spirals, with the color of the portions of each of said spirals overlying said sectors corresponding respectively to the colors of the respective sectors, with each sector representing a stage of a continuous development process.

2. A device as set forth in claim 1 wherein portions of said spiral may rise or fall relative to said base.

3. A device as set forth in claim 1 wherein portions of said spiral may rise or fall relative to said base to indicate progression or retrogression of a civilization, in the study of history.

4. A device as set forth in claim 1 including a re-entrant portion in one of the spirals to indicate a relapse before a continued advance.

5. A device as set forth in claim 1 wherein the spacing between successive spirals in a horizontal plane is a measure of time lapse.

6. A device as set forth in claim 1 including a vertical post extending upwardly from said base at a point displaced from the center thereof whereat the conical helix terminates, a flexible but self-sustaining continuation of said helix having one end thereof affixed to said post, said spirally shaped continuation adapted to be contoured at will to illustrate additional principles, and clips adjustably mounted on said spirally-shaped continuation to indicate the stages of development in lieu of the differently colored lengths of the inner fixed spirals of the conical helix.

References Cited

UNITED STATES PATENTS

D. 149,106   3/1948   Berman.

FOREIGN PATENTS 55,975   6/1952   France.
(Addition to 991,133)

6,764   1897   Great Britain.

EUGENE R. CAPOZIO, Primary Examiner

WILLIAM H. GRIEB, Assistant Examiner